United States Patent
Douzono et al.

(10) Patent No.: US 6,837,604 B2
(45) Date of Patent: Jan. 4, 2005

(54) LIGHTING APPARATUS

(75) Inventors: Shigetaka Douzono, Fukui (JP); Takefumi Inoue, Fukui (JP); Tetsuya Koma, Fukui (JP); Yoshiharu Abe, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/219,557

(22) Filed: Aug. 15, 2002

(65) Prior Publication Data

US 2003/0039114 A1 Feb. 27, 2003

(30) Foreign Application Priority Data

Aug. 24, 2001 (JP) ........................................ 2001-254320

(51) Int. Cl.[7] ................................................ F21S 8/10
(52) U.S. Cl. ........................ 362/545; 362/240; 362/248; 362/244; 362/800; 362/84; 362/85; 362/24; 345/170; 200/313; 200/317
(58) Field of Search ................................ 362/545, 240, 362/248, 244, 800, 84, 85, 24, 88, 209, 231, 234, 276; 345/170; 200/313, 317, 314, 315

(56) References Cited

U.S. PATENT DOCUMENTS 4,811,175 A * 3/1989 DeSmet ........................ 362/95
5,697,493 A * 12/1997 Sach et al. .................... 200/314
6,346,973 B1 * 2/2002 Shibamoto et al. ........... 349/69

* cited by examiner

Primary Examiner—Stephen Husar
Assistant Examiner—Bertrand Zeade
(74) Attorney, Agent, or Firm—RatnerPrestia

(57) ABSTRACT

A lighting apparatus is configured by disposing an EL element inside a stationary housing including, about its top side, an operating part including a plurality of arranged push buttons as well as inside a movable housing openably mounted to the stationary housing and having a display part at its surface, and connecting a control circuit to the EL elements, the operating part and the display part. The control circuit controls light emission of the respective EL elements of the stationary housing and the movable housing to illuminate the operating part and the display part, so that the lighting apparatus simple in structure is capable of various illuminations.

9 Claims, 3 Drawing Sheets

LIGHTING APPARATUS

FIELD OF THE INVENTION

The present invention relates to a lighting apparatus used in a variety of electronic devices including a personal computer and a portable telephone.

BACKGROUND OF THE INVENTION

Recently, while electronic apparatuses including a personal computer and a portable telephone have been equipped with various and better functions, a lighting apparatus used in such electronic apparatuses have been, therefore, demanded diversities of lighting and operation.

Such a conventional lighting apparatus is described with reference to FIG. 6.

FIG. 6 is a sectional view of the conventional lighting apparatus. This lighting apparatus has the following structure. In FIG. 6, stationary housing 1 has a box shape and is made of insulating resin. A plurality of push buttons 2 is arranged about a top surface of stationary housing 1. Inside this housing 1, switching contacts 3 are disposed below respective buttons 2 to each establish electrical connection and disconnection at the press of button 2. Operating part 4 is formed of these buttons 2 and contacts 3.

Wiring board 5 is disposed below switching contacts 3 and has a plurality of wiring patterns (not shown) on its top and bottom surfaces. A plurality of light-emitting diodes (hereinafter referred to as "LEDs") 6 is mounted on the top surface of this board 5.

Movable housing 7 has a box shape and is made of insulating resin. This housing 7 is mounted to an end of stationary housing 1 so as to open and close on its lower end, and is provided with display part 8 such as a liquid crystal display (hereinafter referred to as "LCD") at its surface facing operating part 4. Inside movable housing 7, fluorescent lamp 9 is disposed behind display part 8.

An arithmetic means, a storage means, a communication means and others that are formed of a microcomputer, a variety of electronic parts and others are positioned inside stationary housing 1 and movable housing 7 of the lighting apparatus having such a structure. In this way, the electronic device such as the personal computer or the portable telephone is formed.

In the above structure, when specified push button 2 is pressed downward, switching contact 3 positioned below this button 2 is pressed by this button 2 and establishes the electrical connection and disconnection, and a letter, a numeric value, a mark or the like that corresponds to this operation is displayed on display part 8. Display part 8 is illuminated corner to corner from behind by fluorescent lamp 9, so that a display on display part 8 becomes easy to see, and the letter, the numeric value, the mark or the like can be visually identified without fail.

The conventional lighting apparatus is thus configured to facilitate the visual identification of the displayed letter or the like even in dark environment. Also, this conventional lighting apparatus facilitates the visual identification of the position of each button 2 even in dark environment because the plurality of LEDs 6 on the top surface of wiring board 5 emits light, with which the plurality of buttons 2 is illuminated simultaneously from below.

The conventional lighting apparatus described above, however, has the following problems. Expensive fluorescent lamp 9 is used to illuminate display part 8. Since push buttons 2 are illuminated by LEDs 6 disposed below respective buttons 2, in cases where many buttons 2 are arranged, the number of LEDs 6 should be equal to the number of push buttons, thereby causing the increased number of components to be used and it takes time to mount the components onto wiring board 5. Consequently, the conventional lighting apparatus becomes costly.

SUMMARY OF THE INVENTION

The present invention aims to provide a lighting apparatus including:

a first housing including an operating part including a plurality of arranged push buttons;

a second housing openably mounted to the first housing and including a display part at a surface thereof facing the operating part;

an electroluminescent (EL) element disposed inside at least one of the first and second housings; and a control circuit connected to the EL element, the operating part and the display part, wherein the control circuit controls light emission of the EL elements to illuminate the operating part and the display part.

DESCRIPTION OF THE PREFERRED EMBODIMENTS

Exemplary embodiments of the present invention are demonstrated hereinafter with reference to FIGS. 1–5. Elements similar to those in the prior art have the same reference marks, and those elements are described briefly.

(Exemplary Embodiment 1)

Figure 1:
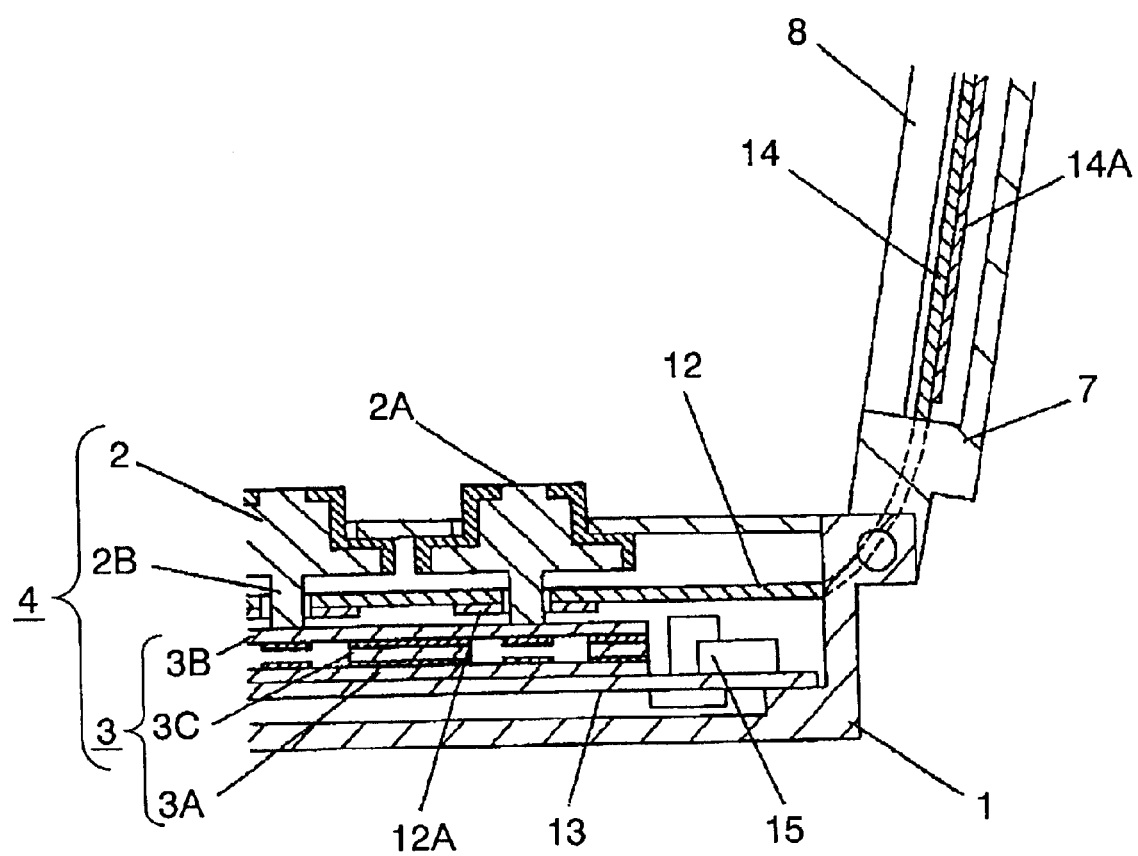
FIG. 1 is a sectional view of a lighting apparatus in accordance with a first exemplary embodiment of the present invention.

FIG. 1 is a sectional view of a lighting apparatus in accordance with the first exemplary embodiment of the present invention. The lighting apparatus has the following structure. In FIG. 1, stationary housing (also referred to as "first housing") 1 has a box shape and is made of insulating resin. A plurality of push buttons 2 dark in color is arranged about a top surface of stationary housing 1, and each one of these buttons 2 has, at its top surface, semitransparent or colored in milk-white push part 2A exposed in the form of a letter, a mark, a design or the like.

Inside stationary housing 1, switching contact 3 is disposed below push buttons 2 to establish electrical connection and disconnection at the press of button 2. Operating part 4 is formed of these buttons 2 and switching contact 3.

Switching contact 3 is configured as what is called a membrane switch. In this membrane switch, base substrate 3A and flexible insulating film 3B are put together to face each other across insulating spacers 3C each having both surfaces coated with adhesive, and a plurality of fixed contacts on a top surface of base substrate 3A and a plurality of movable contacts on a bottom surface of insulating film 3B have an established spacing in opposed relation.

Electroluminescent element (hereinafter referred to as "EL element") 12 is disposed below push buttons 2 and has a plurality of light-emitting parts 12A formed below respective buttons 2. Wiring board 13 is disposed below switching contact 3 and is formed with a plurality of wiring patterns (not shown) on its top and bottom surfaces.

Movable housing (also referred to as "second housing") 7 has a box shape and is made of insulating resin. This housing 7 is mounted to an end of stationary housing 1 so as to open and close on its lower end, and is formed with display part 8 such as a liquid crystal display at its surface facing operating part 4. Inside movable housing 7, EL element 14 having light-emitting parts 14A is disposed behind display part 8 and is integral with EL element 12.

Inside stationary housing 1, a microcomputer, an inverter, a switching element, a transformer circuit, a timer and others that form control circuit 15 are formed over the top and bottom surfaces of wiring board 13. This control circuit 15 is connected to switching contact 3, display part 8 and EL elements 12, 14.

Figure 2:
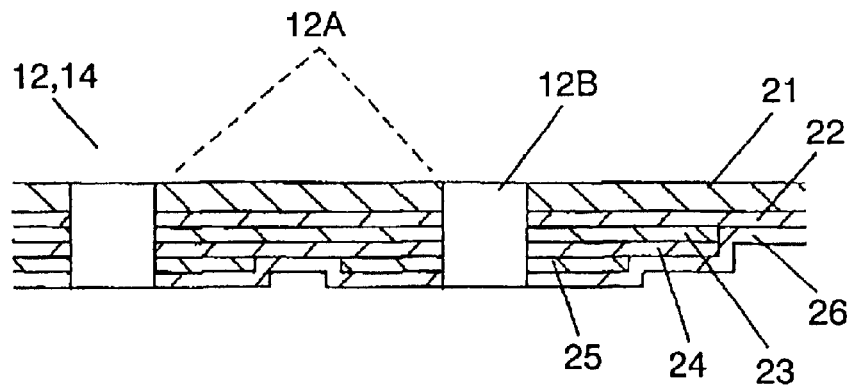
FIG. 2 is a sectional view of an EL element in accordance with the first exemplary embodiment of the present invention.

FIG. 2 is a section of EL element 12 or 14 mentioned above. EL elements 12, 14 each have the following structure. In FIG. 2, substrate 21 is a film of polyethylene terephthalate, polyimide or the like and transmits light. Optically transparent electrode layer 22 is formed over the whole bottom surface of this substrate 21 by sputtering or a method using an electron beam, or by applying optically transparent synthetic resin including dispersed indium tin oxide or the like through printing.

El element 12 is provided with a plurality of holes 12B for permitting passage of respective projections 2B projecting downwardly from respective push buttons 2. Light-emitting layer 23, formed by dispersing light-emitting host material such as zinc sulfide in synthetic resin having a high dielectric constant, such as fluororubber resin or cyanic resin, and dielectric layer 24, formed by dispersing barium titanate or the like in the same synthetic resin as that of layer 23, are laid in this order over optically transparent electrode layer 22 by printing.

A plurality of backplate electrode layers 25 made of resin including silver or carbon is laid, by printing, over respective parts of dielectric layer 24 that correspond to respective buttons 2. In this way, the plurality of light-emitting parts 12A is formed. All these layers are collectively covered with insulating layer 26 made of epoxy resin, polyester resin or the like.

An arithmetic means, a storage means, a communication means and others that are formed of the microcomputer, a variety of electronic parts and others are positioned inside stationary housing 1 and movable housing 7 of the lighting apparatus having such a structure. In this way, an electronic device such as a personal computer or a portable telephone is formed.

In the above structure, when specified push button 2 of operating part 4 is pressed downward, insulating film 3B is pressed by projection 2B of this button 2 and bends, thereby bringing the corresponding movable contact positioned on the bottom surface of film 3B into contact with the corresponding fixed contact on the top surface of base substrate 3A. In this way, switching contact 3 is conducted each other.

Control circuit 15 connected to switching contact 3 illuminates specified buttons 2 and display part 8 controlling light emission of light-emitting parts 12A of EL element 12 and light-emitting parts 14A of EL element 14.

Specifically, the microcomputer of control circuit 15 controls the switching element and others. When a voltage is applied between optically transparent electrode layer 22 and specified backplate electrode layer 25 of EL element 12 from the inverter, a part of light-emitting layer 23 that is positioned between these electrode layers 22, 25, that is, corresponding specified light-emitting part 12A emits light. Corresponding specified push button 2 is illuminated with this light from below, so that its push part 2A having the form of the letter, the mark, the design or the like can be identified even in dark environment.

A letter, a numeric value, a mark or the like that corresponds to the operation of button 2 is displayed on display part 8, and display part 8 is illuminated corner to corner from behind by EL element 14, so that the whole display on display part 8 becomes easy to see, and the letter, the numeric value, the mark or the like can be visually identified without fail.

At the press of specified push button 2, control circuit 15 is also capable of illuminating the plurality of buttons 2 associated with a function of this button 2 pressed or illuminating the specified letter or a specified part on display part 8 by detecting the corresponding electrical conduction of switching contact 3.

When a voltage is applied between optically transparent electrode layer 22 and every one of backplate electrode layers 25, light-emitting parts 12A of EL element 12 all emit light, whereby buttons 2 are all illuminated simultaneously. This facilitates the operation of buttons 2 even in dark environment.

As described above, the lighting apparatus of the present embodiment is simple in structure, is capable of various illuminations and does not require an expensive fluorescent lamp and a plurality of light-emitting diodes.

Since EL element 12 of stationary housing 1 is formed integrally with EL element 14 of movable housing 7, operating part 4 and display part 8 can be illuminated by the single EL element. Accordingly, the number of components to be used can be reduced, and the lighting apparatus can be built at low cost.

As described above, EL element 12 (14) is formed with the plurality of light-emitting parts 12A (14A), and control circuit 15 illuminates specified push button 2 or the specified part on display part 8 by controlling the light emission of the EL element. Such a simple structure allows various illuminations including the illumination of specified button 2 or the specified letter on display part 8 that is associated with the specific function of pressed button 2.

In the above description, the plurality of light-emitting parts 12A is formed by forming optically transparent electrode layer 22, light-emitting layer 23 and dielectric layer 24 over the whole bottom surface of substrate 21 of EL element 12 and forming only backplate electrode layer 25 in parts. However, the present invention can be carried out even when light-emitting parts 12A are formed by forming light-emitting and dielectric layers 23, 24 in parts or forming not only light-emitting and dielectric layers 23, 24 in parts but also optically transparent electrode layer 22 in parts.

(Exemplary Embodiment 2)

Figure 3:
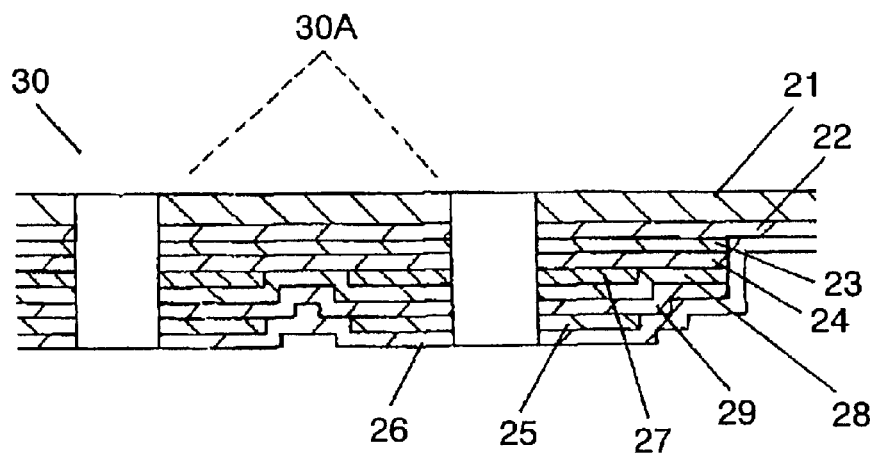
FIG. 3 is a sectional view of an EL element in accordance with a second exemplary embodiment of the present invention.

FIG. 3 is a sectional view of an electroluminescent element (hereinafter referred to as "EL element") in accordance with the second exemplary embodiment of the present invention. Elements similar to those in the first embodiment have the same reference marks, and the detailed descriptions of those elements are omitted.

El element 30 has the following structure. In FIG. 3, optically transparent electrode layer 22 is formed over the whole bottom surface of light-transmissible substrate 21 as in the first embodiment, and light-emitting layer 23 and dielectric layer 24 are laid in this order over this electrode layer 22 by printing as in the first embodiment.

A plurality of intermediate electrode layers 27 is laid, by printing, over respective parts of dielectric layer 24 that correspond to respective push buttons (not shown) positioned above EL element 30. These intermediate electrode layers 27 are formed of light-transmissible synthetic resin including dispersed silver or carbon and transmit light similarly to optically transparent electrode layer 22.

Light-emitting layer 28 having a luminescent color different from that of light-emitting layer 23, dielectric layer 29 and a plurality of backplate electrode layers 25 are laid in this order over layers 27 by printing. In this way, a plurality of light-emitting parts 30A is formed. All these layers are collectively covered with insulating layer 26 made of epoxy resin, polyester resin or the like.

EL element 30 having such a structure is disposed inside stationary housing (also referred to as "first housing") 1, together with the plurality of push buttons 2, switching contact 3 and others as well as inside movable housing (also referred to as "second housing") 7, together with display part 8 and is connected to control circuit 15 as in the first embodiment illustrated by FIG. 1. In this way, a lighting apparatus is formed.

In the above structure, when a voltage is applied to between optically transparent electrode layer 22 and one of the plurality of intermediate electrode layers 27 of EL element 30 under control of control circuit 15, a part of light-emitting layer 23 that is positioned between these electrode layers 22, 27 emits light, whereby corresponding specified button 2 is illuminated with this light from behind as in the first embodiment.

When a voltage is applied to between one of the plurality of intermediate electrode layers 27 and corresponding backplate electrode layer 25, a part of light-emitting layer 28 that is positioned between these layers 27, 25 emits light. This light is different from that of light-emitting layer 23 in luminescent color.

For example, in cases where light-emitting layer 23 and light-emitting layer 28 have the respective luminescent colors of blue-green and orange, a voltage applied to between optically transparent electrode layer 22 and intermediate electrode layer 27 causes light-emitting part 30A to emit blue-green light, and a voltage applied to between intermediate electrode layer 27 and backplate electrode layer 25 causes light-emitting part 30A to emit orange light.

When a voltage is applied to between optically transparent electrode layer 22 and every one of intermediate electrode layers 27 as well as between every one of intermediate electrode layers 27 and every corresponding one of backplate electrode layers 25, light-emitting layers 23, 28 emit lights simultaneously, so that EL element 30 as a whole emits white light, a combination of blue-green and orange lights, whereby push buttons 2 or display part 8 is illuminated with this light from behind.

Thus, when, for example, specified button 2 is pressed with all the buttons 2 or display part 8 being illuminated with the blue-green light, control circuit 15 can illuminate only buttons 2 associated with a function of this button 2 pressed with the orange light or illuminate only the specified letter or a specified part on display part 8 with the white light by detecting the corresponding electrical conduction of switching contact 3 and changing the application of the voltage to the electrode layers of EL element 30.

According to the present embodiment described above, each one of light-emitting parts 30A of EL element 30 emits the plurality of lights of different colors, so that specified push button 2 or the specified part on display part 8 can be illuminated with the light different from the others in luminescent color. The lighting apparatus is thus capable of various illuminations and facilitating the operation and identification of button 2 and display part 8.

(Exemplary Embodiment 3)

Figure 4:
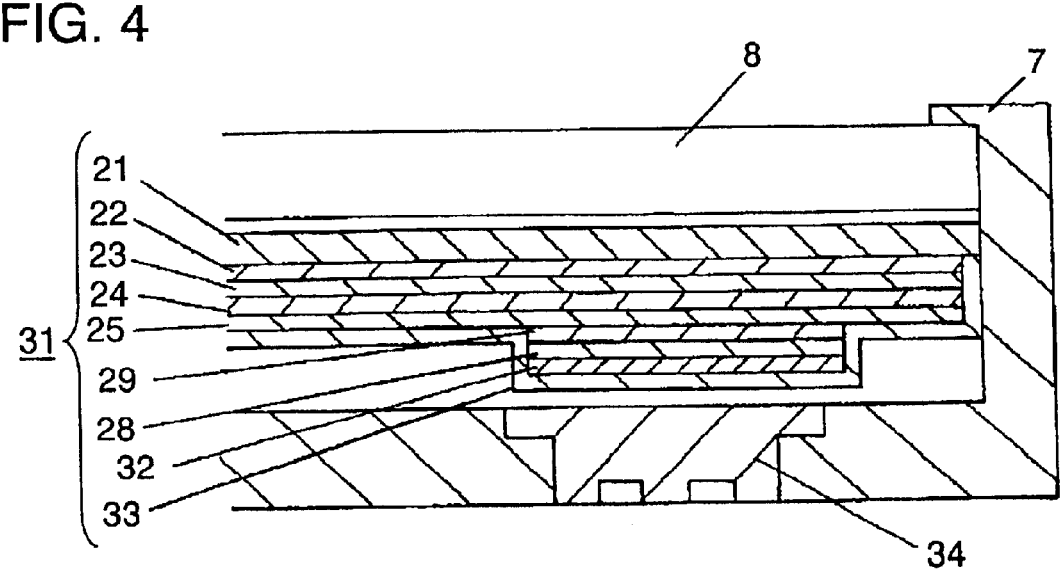
FIG. 4 is a partially sectional view of a lighting apparatus in accordance with a third exemplary embodiment of the present invention.

FIG. 4 is a partially sectional view of a lighting apparatus in accordance with the third exemplary embodiment of the present invention. Elements similar to those in the first and second embodiments have the same reference marks, and the detailed descriptions of those elements are omitted.

In FIG. 4, display part 8 such as a liquid crystal display is formed at a surface of movable housing (also referred to as "second housing") 7 openably mounted to an end of stationary housing (also referred to as "first housing") 1 (not shown) as in the first embodiment, and electroluminescent element (hereinafter referred to as "EL element") 31 is disposed inside movable housing 7 as in the first embodiment.

EL element 31 has the following structure. Optically transparent electrode layer 22, light-emitting layer 23, dielectric layer 24 and backplate electrode layer 25 are laid in this order over the whole bottom surface of substrate 21 of EL element 31 by printing as in the first embodiment.

Dielectric layer 29 and light-emitting layer 28 having a luminescent color different from that of light-emitting layer 23 are laid in this order over a specified part of layer 25 by printing.

Optically transparent rear electrode layer 32 made of synthetic resin including dispersed silver or carbon is formed over light-emitting layer 28 by printing, and all these layers are collectively covered with cover layer 33 made of epoxy resin, polyester resin or the like. This cover layer 33 transmits light similarly to rear electrode layer 32.

Movable housing 7 is mounted with, at a part of its back side that corresponds to light-emitting layer 28 or rear electrode layer 32, semitransparent or colored in milk-white display board 34 having a company's name, a model's name, a logo, a design or the like on its bottom surface.

EL element 31 is connected to control circuit 15, together with switching contact 3 (not shown) of stationary housing 1, display part 8, and others as in the first embodiment. In this way, the lighting apparatus is formed.

In the above structure, when a voltage is applied to between optically transparent electrode layer 22 and backplate electrode layer 25 of EL element 31 under control of control circuit 15, light-emitting layer 23 positioned between these electrode layers 22, 25 emits light, whereby display part 8 is illuminated corner to corner from behind with this light as in the first embodiment.

When a voltage is applied to between backplate electrode layer 25 and rear electrode layer 32, light-emitting layer 28 positioned between these electrode layers 25, 32 emits light.

This light passes through cover layer 33. Consequently, display board 34, and the logo or design shown on the bottom surface of board 34 are illuminated with this light. The lighting apparatus is thus capable of illuminations adapted to various functions of an electronic device using this lighting apparatus.

For example, when a battery of the electronic device becomes weak or when a telephone call, e-mail or the like is received with movable housing 7 closed and display board 34 facing upward, light-emitting layer 28 is caused to emit the light, whereby the logo or the design on display board 34 is caused to flash. A user can thus be notified of a remaining life or the like of the battery, or the receipt of the telephone call, the e-mail or the like.

According to the present embodiment, a specified part of EL element 31 emits the light from both sides, so that a corresponding specified part of a bottom side of stationary housing 1 or a corresponding specified part of the back side of movable housing 7 is illuminated. Thus, the various illuminations other than the illumination of operating part 4 and the illumination of display part 8 can also be carried out to adapt to the functions of the electronic device.

In the above description, the EL element is configured to emit the light from both sides by forming light-emitting layer 23 over the bottom surface of substrate 21 and forming light-emitting layer 28 and rear electrode layer 32 over backplate electrode layer 25. However, the present invention can be carried out even when EL elements, which have various structures for each emitting light from both sides, are used. One of such EL elements includes optically transparent electrode layer 22, light-emitting layer 23 and optically transparent intermediate electrode layer 27 that are formed over the whole top surface of substrate 21, and optically transparent electrode layer 22, light-emitting layer 28 and rear electrode layer 32 that are formed over a specified part of the bottom surface of substrate 21.

(Exemplary Embodiment 4)

Figure 5:
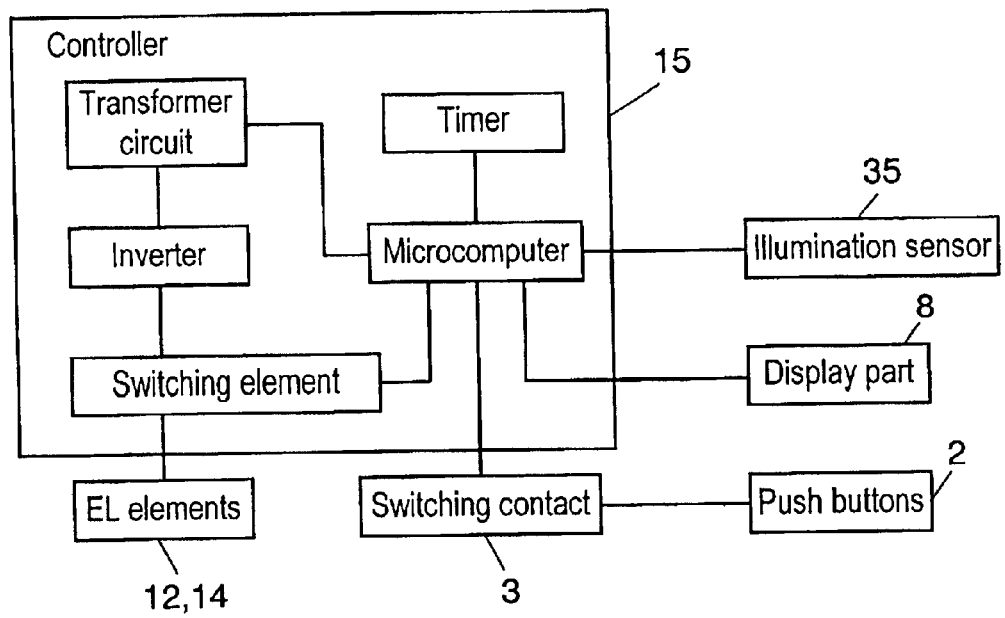
FIG. 5 is a schematic circuit diagram of a lighting apparatus in accordance with a fourth exemplary embodiment of the present invention.
Figure 6:
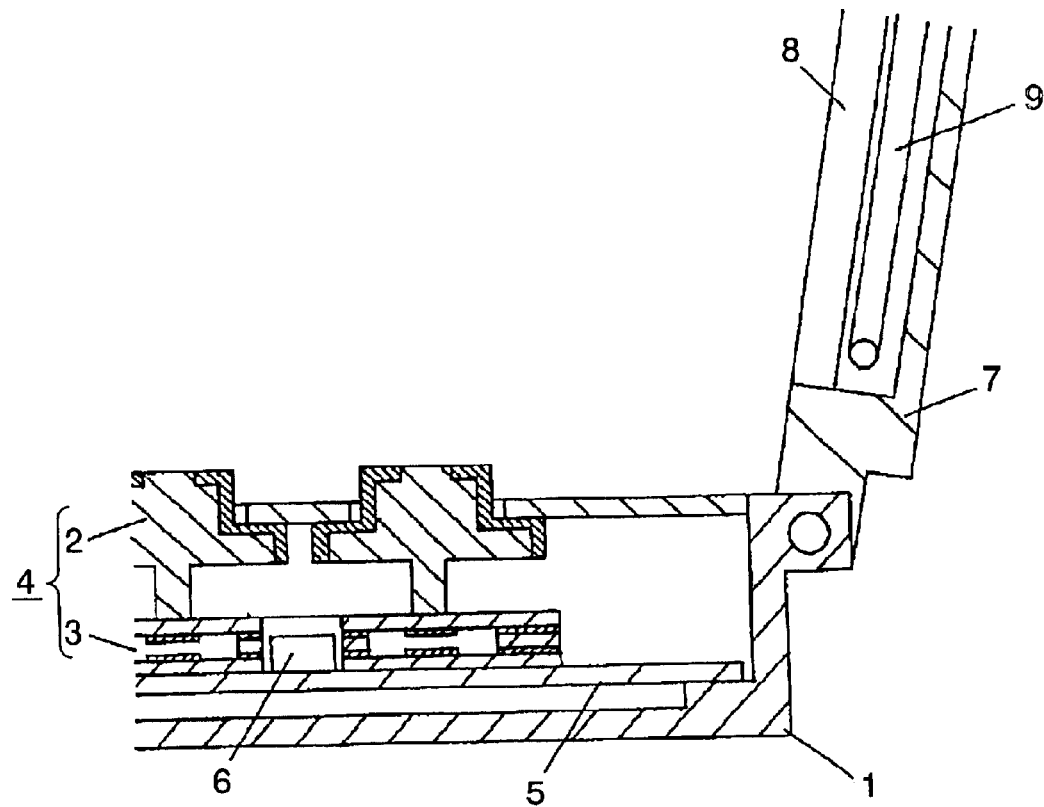
FIG. 6 is a sectional view of a conventional lighting apparatus.

FIG. 5 is a schematic circuit diagram of a lighting apparatus in accordance with the fourth exemplary embodiment of the present invention. Elements similar to those in the first to third embodiments have the same reference marks, and the detailed descriptions of those elements are omitted.

In FIG. 5, a microcomputer, an inverter, a switching element, a transformer circuit, a timer and others that form control circuit 15 are formed, as in the first embodiment, inside stationary housing (also referred to as "first housing") 1 (not shown) to which movable housing (also referred to as "second housing") 7 (not shown) is openably mounted, and this control circuit 15 is connected to switching contact 3, electroluminescent elements (hereinafter referred to as "EL elements") 12, 14 and others as in the first embodiment.

EL element 12 of stationary housing 1 is formed integrally with EL element 14 of movable housing 7 as in the first embodiment. The lighting apparatus of the present embodiment further includes illumination sensor 35, mounted to a specified part of stationary housing 1 or movable housing 7, for detecting ambient brightness. This sensor 35 is connected to control circuit 15.

In the above structure, control circuit 15 controls light emission of EL elements 12, 14 to illuminate push button 2 and display part 8 as in the first embodiment. Also, control circuit 15 changes brightness of EL element 12 or 14 by controlling a voltage to be applied to from the inverter in response to illumination detected by illumination sensor 35.

Specifically, illumination sensor 35 detects the brightness of the environment in which an electronic device is used, and control circuit 15 varies the voltage or the like to be applied to according to this illumination, thereby causing EL elements 12, 14 to emit bright light in the light and dim light in dark environment. Push button 2 and display part 8 are thus illuminated with illumination adapted to the ambient brightness, and consequently, the letter or the like on button 2, and a display on display part 8 can be easily seen.

Illumination sensor 35 also detects the brightness of EL elements 12, 14. When the brightness of EL elements 12, 14 reduces, control circuit 15 controls the voltage or the like to be applied to accordingly. Consequently, the brightness of EL elements 12, 14 can be prevented from reducing, and button 2 and display part 8 can always be illuminated with stabilized brightness.

According to the present embodiment, illumination sensor 35 is provided and connected to control circuit 15, and this circuit 15 changes the brightness of EL elements 12, 14 according to the illumination detected by sensor 35, so that push buttons 2 and display part 8 can be illuminated for high visibility according to the ambient brightness and the brightness of EL elements 12, 14.

When movable housing 7 is closed, control circuit 15 turns off the light of EL elements 12, 14, so that power consumption can be reduced when the electronic device is idle for a fixed time during which housing 7 is closed.

In the above description, switching contact 3 shown in FIG. 1 has been explained as the membrane switch in which the fixed contacts of base substrate 3A and the movable contacts of insulating film 3B have the established spacing in opposed relation. However, the present invention can be carried out even when the switching contact has, for example, a structure in which movable contacts, made of resilient metal foil and each having a center portion protruding like a dome, are disposed above respective fixed contacts of a wiring board and are each turned inside out by the a push button for connection to and disconnection from the fixed contact, a structure using domed movable contacts made of rubber or elastomer for connection to and disconnection from respective fixed contacts, or a structure employing a single push-switch.

It is to be noted that those, such as the transformer circuit and the timer, usually included in the electronic device mounted with the lighting apparatus may be used as components of control circuit 15.

As described above, each one of the lighting apparatuses of the present invention is simple in structure and is capable of the various illuminations.

What is claimed is:

1. A lighting apparatus comprising:
    a first housing including an operating part including a plurality of arranged push buttons;
    a second housing openably mounted to said first housing and including a display part at a surface thereof facing said operating part;
    an electroluminescent (EL) element disposed inside at least one of said first and second housings; and
    a control circuit connected to said EL element, said operating part and said display part,
    wherein said control circuit controls light emission of said EL element to illuminate said operating part and said display part and turns off the light of said EL element when said second housing is closed.

2. The lighting apparatus of claim 1, wherein said EL element of said first housing is integral with said EL element of said second housing.

3. The lighting apparatus of claim 1, wherein said EL elements each include a plurality of light-emitting parts, and said control circuit controls the light emission of said EL elements to illuminate said specified push button and a specified part of said display part.

4. The lighting apparatus of claim 1, wherein said EL element emits a plurality of lights of different colors.

5. The lighting apparatus of claim 1, wherein said EL element emits a white light.

6. The lighting apparatus of claim 1, wherein a specified part of said EL element emits light from both sides thereof to illuminate a corresponding specified part of one of a bottom side of said first housing and a back side of said second housing.

7. A lighting apparatus comprising:

a first housing including an operating part including a plurality of arranged push buttons;

a second housing movably mounted to open and close with respect to said first housing and including a display part at a surface thereof facing said operating part;

an electroluminescent (EL) element disposed inside at least one of said first and second housings;

a control circuit connected to said EL element, said operating part and said display part; and an illumination sensor connected to said control circuit, wherein said control circuit controls light emission of said EL elements to illuminate said operating part and said display part, and changes brightness of said EL element according to illumination detected by said illumination sensor.

8. The lighting apparatus of claim 1, wherein said control circuit controls said EL element by depressing said push button.

9. The lighting apparatus of claim 7, wherein said control circuit turns off the light of said EL element when said second housing is closed.

* * * * *